US012686146B2

(12) United States Patent
Pozzo

(10) Patent No.: US 12,686,146 B2
(45) Date of Patent: Jul. 21, 2026

(54) ROTATABLE TOOL-ASSEMBLY FOR PROCESSING WOODEN PANELS AND THE LIKE

(71) Applicant: C.M.T. UTENSILI S.P.A, Pesaro (IT)

(72) Inventor: Piergiorgio Pozzo, Pesaro (IT)

(73) Assignee: C.M.T. UTENSILI S.P.A, Pesaro (IT)

( * ) Notice: Subject to any disclaimer, the term of this patent is extended or adjusted under 35 U.S.C. 154(b) by 281 days.

(21) Appl. No.: 18/560,585

(22) PCT Filed: Dec. 7, 2021

(86) PCT No.: PCT/IB2021/061412

§ 371 (c)(1),
(2) Date: Nov. 13, 2023

(87) PCT Pub. No.: WO2022/248930

PCT Pub. Date: Dec. 1, 2022

(65) Prior Publication Data

US 2024/0253262 A1 Aug. 1, 2024

(30) Foreign Application Priority Data

May 25, 2021 (IT) ........................ 102021000013532

(51) Int. Cl.
*B27G 13/00* (2006.01)
*B27B 5/12* (2006.01)

(52) U.S. Cl.
CPC .............. *B27G 13/005* (2013.01); *B27B 5/12* (2013.01)

(58) Field of Classification Search
CPC .... B27G 13/00; B27G 13/002; B27G 13/005; B27G 13/02; B27G 13/08; B23C 5/08; B23C 2210/244
See application file for complete search history.

(56) References Cited

U.S. PATENT DOCUMENTS

| | | | |
|---|---|---|---|
| 5,309,962 | A | 5/1994 | Mccord et al. |
| 10,105,773 | B1 | 10/2018 | Brewer |
| 2010/0024920 | A1 | 2/2010 | Jensen |

FOREIGN PATENT DOCUMENTS

| | | | |
|---|---|---|---|
| DE | 102010054392 | A1 | 6/2012 |
| EP | 1992463 | A2 | 11/2008 |
| WO | 2018137983 | A1 | 8/2018 |

OTHER PUBLICATIONS

International Search Report and Written Opinion from International Application No. PCT/IB2021/061412 mailed Apr. 7, 2022.

*Primary Examiner* — Matthew Katcoff
(74) *Attorney, Agent, or Firm* — Jon E. Gordon; Haug Partners LLP

(57) ABSTRACT

A rotatable tool-assembly for processing wooden panels and the like, of the type comprising at least a first and a second disc blades that are adapted to be fitted on a same spindle, one beside and coaxial with the other; said first and said second disc blades being both provided with a central discoidal body and a cutting toothed crown that comprises a plurality of protruding teeth at least one of which has the front edge covered by a cutting insert; the cutting toothed crown of the first disc blade being structured so as to be able to mesh in an angularly rigid manner with the cutting toothed crown of the second disc blade and vice versa.

17 Claims, 4 Drawing Sheets

ROTATABLE TOOL-ASSEMBLY FOR PROCESSING WOODEN PANELS AND THE LIKE

CROSS-REFERENCE TO RELATED APPLICATIONS

This patent application is a U.S. national stage of PCT International Application No. PCT/IB2021/061412 filed on Dec. 7, 2021, which claims priority from Italian patent Application No. 102021000013532 filed on May 25, 2021, the entire disclosure of each of which is incorporated herein by reference.

TECHNICAL FIELD

The present invention relates to a rotatable tool-assembly for processing wooden panels and the like.

More specifically, the present invention relates to a modular and sectional rotatable tool-assembly capable of making rectilinear grooves on wooden panels and the like. Use to which the following disclosure will make explicit reference without thereby losing in generality.

BACKGROUND ART

As is known, on the market there are tool-assemblies discoidal in shape and with a sectional modular structure, which are adapted to be mounted on the spindle of a traditional table saw and are specifically structured to make, on any wooden panel, a rectilinear groove with a predefined width selectable by the user.

More specifically, these particular rotatable tool-assemblies with sectional modular structure, traditionally called "dado sets" or "dado blades", are made up of a pair of disc blades having equal dimensions and of a given number of modular and selectively-removable spacer elements, roughly discoidal in shape, which are interposable between the two disc blades and are adapted to maintain the disc blades at a predefined distance one from the other when the two disc blades are gripped one against the other and locked in an angularly rigid manner on the spindle of the table saw or of the radial mitre saw.

More in detail, the number and the nominal thickness of the various removable spacer elements are chosen so as to allow the user to vary the distance between the two disc blades of the tool-assembly between a predefined minimum value and a predefined maximum value, suitably combining some or all the spacer elements that form the sectional rotatable tool-assembly.

Additionally, the removable spacer element/elements having greater thickness, traditionally called "chippers", are additionally provided with cutting teeth that, likewise to the cutting teeth of the two lateral disc blades, are capable of carving and chopping the wood or other constituent material of the panel.

Clearly the distance between the two disc blades determines the width of the rectilinear groove that is formed on the wooden panel.

Unfortunately, despite being very versatile, the above-described modular and sectional tool-assemblies are relatively dangerous tools, because the two lateral disc blades and the possible chippers are locked together by friction, thanks to the compression exerted by the spindle on the two lateral disc blades, with all the problems that this entails.

In fact, if the tightening of the spindle of the table saw loosens for any reason, the two disc blades and the chippers can start freely rotating around the axis of the spindle independently of each other.

In this case, the teeth of the lateral disc blades can accidentally rub or even violently beat against each other (in the absence of intermediate spacer elements) or against the immediately adjacent teeth of the chippers. Event potentially very dangerous for the safety of the people that are near the table saw.

The violent impact or the rubbing between the two teeth, in fact, may cause the detachment of the insert/inserts made of widia or other high-resistant hard material, that cover the front edges of the teeth and constitute the cutting part of the tooth. These inserts could then be projected/expelled at a high speed outside of the table saw like a bullet, with the far from remote risk of hitting and injuring the person/persons present in the nearby of the table saw.

The kinetic energy of the inserts that are shot out of the table saw, in fact, can reach values such to injure, even seriously, a person.

DISCLOSURE OF INVENTION

Aim of the present invention is thus to manufacture a modular and sectional tool-assembly for the making of rectilinear grooves on wooden panels and the like, which is intrinsically safer than the "dado sets" or "dado blades" currently on the market, and moreover has production costs comparable to those of the "dado sets" or "dado blades" currently present on the market.

In accordance with these aims, according to the present invention there is provided a rotatable tool-assembly for processing wooden panels and the like as defined in Claim 1 and preferably, though not necessarily, in any one of the claims dependent thereon.

BRIEF DESCRIPTION OF THE DRAWINGS

The present invention will now be described with reference to the accompanying drawings, which illustrate a non-limiting example embodiment thereof, wherein:

FIG. 3 is a perspective view of the tool-assembly illustrated in FIGS. 1 and 2, in a second operating configuration; whereas

BEST MODE FOR CARRYING OUT THE INVENTION

Figure 1:
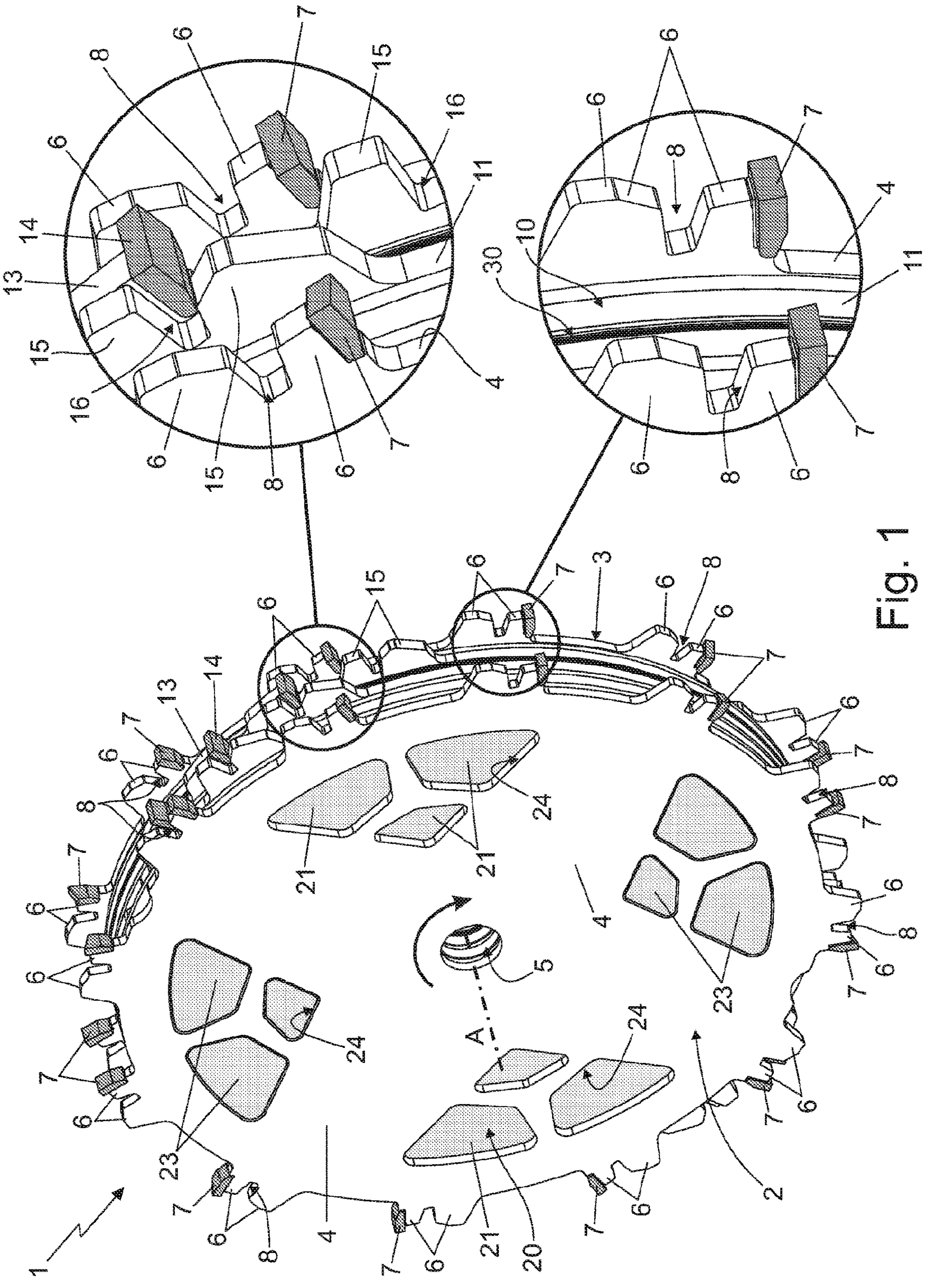
FIG. 1 is a perspective view of a rotatable tool-assembly with sectional modular structure, realized according to the teachings of the present invention.
Figure 2:
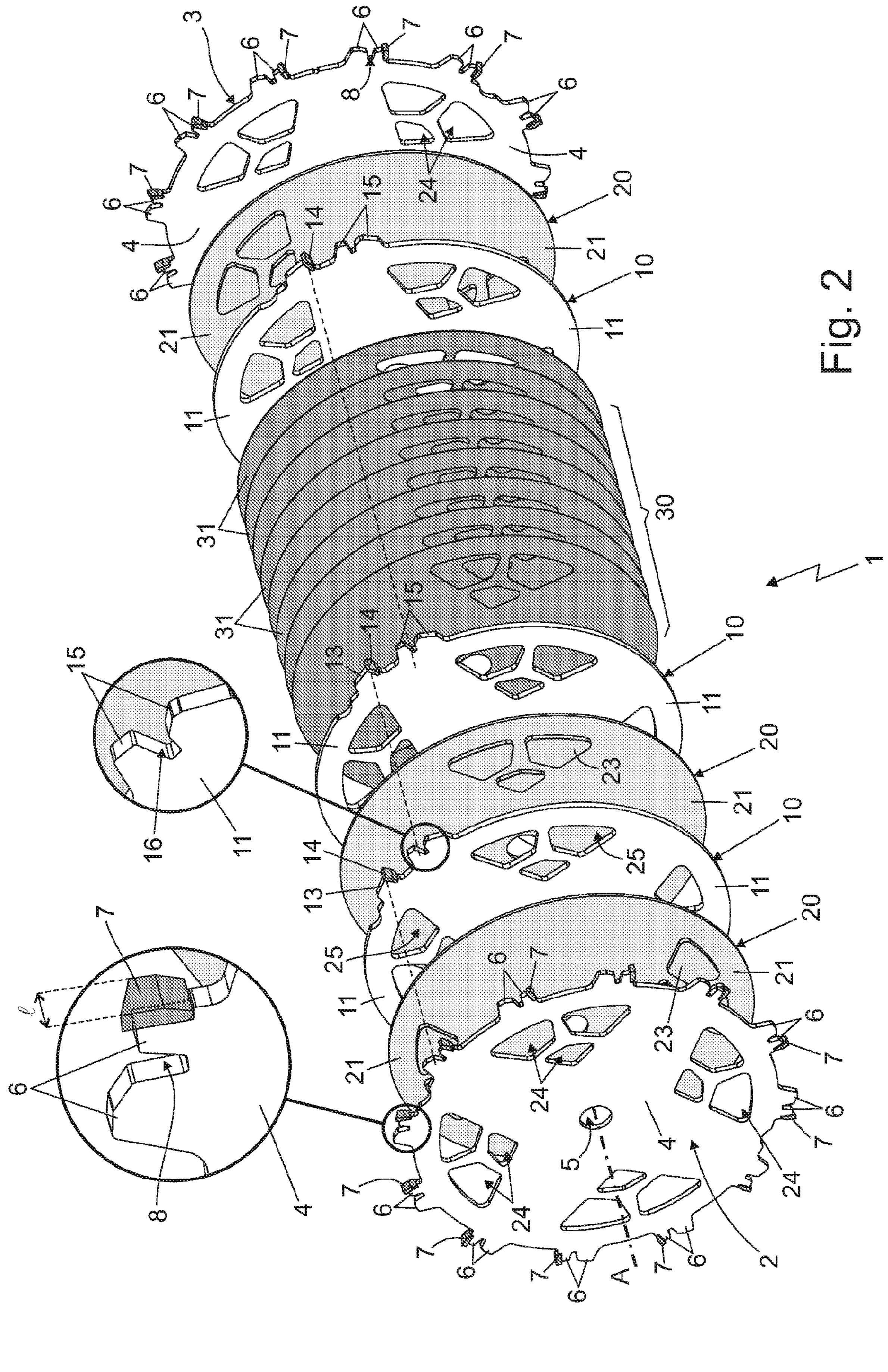
FIG. 2 is an exploded view of the tool-assembly illustrated in FIG. 1.
Figure 3:
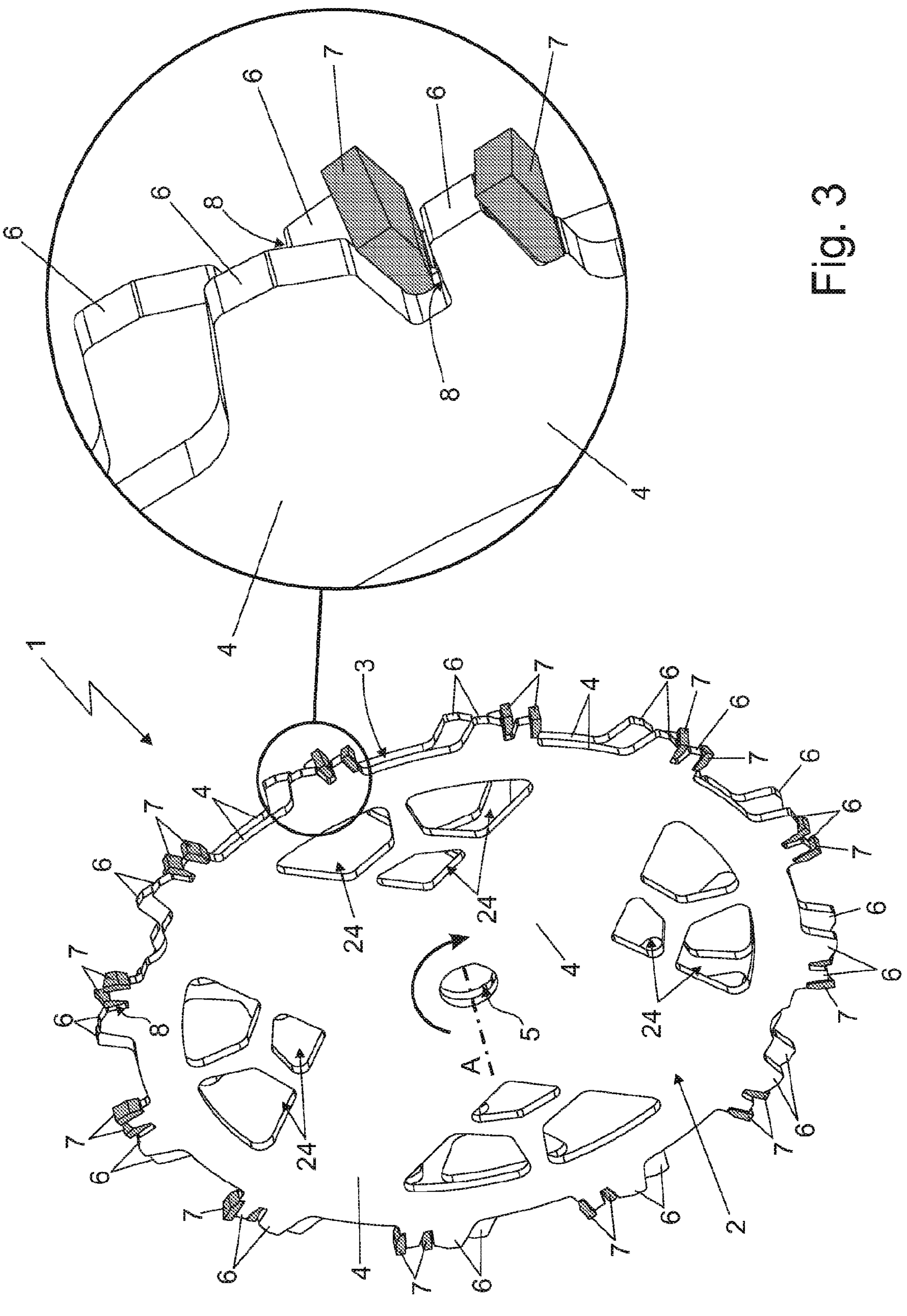

With reference to FIGS. 1, 2 and 3, reference number 1 denotes, as a whole, a substantially discoidal in shape, tool-assembly that has a sectional modular structure, and is adapted to be driven into rotation about its central or barycentric axis A, so as to make, on any wooden panel or the like, a groove having a predefined width.

More in detail, the tool-assembly 1 is adapted to be fitted and fixed on the spindle (not shown) of a general table saw or similar tool machine, so as to be driven into rotation about its central axis A, and is structured so as to carve/make, on the wooden panel or the like, a rectilinear groove whose width is function of the momentary configuration of the same tool-assembly 1.

The tool-assembly 1 firstly comprises a pair of disc blades 2 and 3 separate and distinct one from the other, which have substantially the same nominal diameter, are provided with a central pass-through hole, and are adapted to be fitted onto the spindle (not shown) of the table saw or similar tool machine, one beside and coaxial with the other.

In other words, the disc blades 2 and 3 are adapted to be fixed on the spindle one beside the other, so that the central axis A of the tool-assembly coincides with the rotation axis of the spindle.

Each disc blade 2, 3 furthermore comprises: a central disc 4 preferably made of metal material, which is provided with a central pass-through hole 5 with a given diameter, adapted to be engaged in pass-through manner by the spindle (not shown) of the table saw or similar tool machine; and a series of protruding teeth 6, that extend cantilevered from the periphery of the central disc 4 in a substantially radial direction and are appropriately spaced along the periphery of the central disc 4.

The front edge 6*a* of at least one and preferably each protruding tooth 6 of disc blade 2, 3, in addition, is at least partially covered by an insert 7 made of metal or other hard material, which forms the cutting part of the tooth 6.

Clearly the tool-assembly 1 is driven into rotation about the central axis A so that each cutting insert 7 touches and penetrates the body of the panel before the corresponding tooth 6.

The teeth 6 and the relative cutting inserts 7 form the cutting toothed crown of the disc blade 2, 3.

The central disc 4, in turn, forms the central body of the disc blades 2 and 3.

In addition, the teeth 6 are preferably made in one piece with the central disc 4, and are preferably spaced in a substantially regular manner along the periphery of the central disc 4.

Preferably, each tooth 6 moreover extends cantilevered from the periphery of central disc 4 while remaining substantially coplanar to the central disc 4.

Each cutting insert 7, on the other hand, is firmly fixed to the front edge 6*a* of the tooth 6 preferably via welding and/or brazing.

With reference to FIGS. 1, 2 and 3, additionally the cutting toothed crown of disc blade 2 is structured so as to be able to engage in angularly rigid manner with the cutting toothed crown of disc blade 3 and vice versa.

More in detail, several and more conveniently all the cutting inserts 7 of disc blade 2 are structured/dimensioned so as to extend cantilevered sideways of the front edge 6*a* of the tooth 6, towards the adjacent disc blade 3.

Analogously, several and more conveniently all the cutting inserts 7 of disc blade 3 are structured/dimensioned so as to extend cantilevered sideways of the front edge 6*a* of the tooth 6, towards the adjacent disc blade 2.

At least one tooth 6 and more conveniently each tooth 6 of disc blade 2, in turn, is preferably provided with a small receiving seat 8, which is located spaced behind the front edge 6*a* of the tooth, and thus behind the cutting insert 7, and is shaped/dimensioned so as to be able to house/accommodate any one of the cutting inserts 7 of disc blade 3.

Analogously, at least one tooth 6 and more conveniently each tooth 6 of disc blade 3 is preferably provided with a small receiving seat 8, which is located spaced behind the front edge 6*a* of the tooth, and is shaped/dimensioned so as to be able to house/accommodate any one of the cutting inserts 7 of disc blade 2.

More in detail, with particular reference to FIGS. 1, 2 and 3, each cutting insert 7 of disc blade 2, 3 preferably consists of a small plate or block of widia (tungsten carbide) or other hard metal or composite material, preferably substantially parallelepiped in shape, which is arranged astride of the front edge 6*a* of the protruding tooth 6, and has a maximum width t greater than the local thickness of the tooth 6, so that at least one of the two larger and opposite lateral sides of the block protrudes cantilevered sideways of the same tooth.

In the illustrated example, in particular, the cutting inserts 7 of the disc blade 2, 3, or rather the blocks of widia, are preferably dimensioned so as to protrude cantilevered from both sides of the front edge 6*a* of the protruding tooth 6, preferably in an asymmetric manner.

Each receiving seat 8 of disc blade 2, in turn, preferably consists of a small radial notch made on the crest of the cutting tooth 6, and optionally also has a shape substantially complementary to the profile of the cutting inserts 7 of disc blade 3.

Analogously, each receiving seat 8 of disc blade 3 preferably consists of a small radial notch made on the crest of the cutting tooth 6, and optionally also has a shape substantially complementary to the profile of the cutting inserts 7 of disc blade 2.

With reference to Figures from 1 to 6, in addition, the tool-assembly 1 preferably also comprises at least one and more conveniently a plurality of removable spacer elements, separate and distinct from disc blades 2 and 3, which are discoidal in shape and are selectively interposable between the disc blades 2 and 3, so as to maintain, on the spindle, the disc blades 2 and 3 at a predetermined distance one from the other when the spindle (not shown) approaches and tightens the disc blades 2 and 3 one against the other.

In other words, the removable spacer element/elements are provided with a central pass-through hole, and are adapted to be fitted on the spindle (not shown) of the table saw or similar tool machine, beside the disc blades 2 and 3, so as to be interposed between the disc blades 2 and 3 when the spindle (not shown) tightens the disc blades 2 and 3 one against the other.

Preferably, the number and the nominal thickness of the various removable spacer elements of tool-assembly 1 are moreover chosen so as to allow the user to vary the distance between the disc blades 2 and 3 between a predefined minimum value and a predefined maximum value, suitably combining several or all the removable spacer elements that form the tool-assembly 1.

Figure 4:
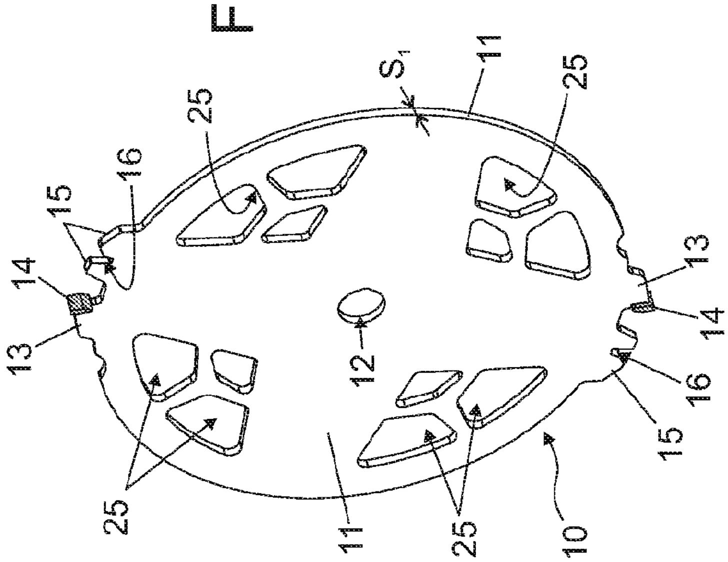

With reference to FIGS. 1, 2 and 4, in particular the tool-assembly 1 preferably comprises at least one and more conveniently a plurality of first removable spacer elements 10, separate and distinct from disc blades 2 and 3, which are substantially discoidal in shape, are provided with a central pass-through hole, and are adapted to be selectively fitted on the spindle (not shown) on their own or in combination with each other, so as to be interposed between the disc blades 2 and 3 for maintaining the disc blades 2 and 3 spaced one from the other when the disc blades 2 and 3 are tightened one against the other by the spindle (not shown).

Preferably the removable spacer element/elements 10 moreover have a nominal diameter substantially equal to or slightly lower than that of the disc blades 2 and 3.

Additionally, the removable spacer element/elements 10 preferably have a nominal thickness $S_1$ that is lower or equal to that of disc blades 2 and 3.

More specifically, the removable spacer elements 10 have a nominal thickness $S_1$ preferably ranging between 1 and 6 mm (millimeters).

The/each removable spacer element 10 is furthermore provided, along the outer periphery, with at least a pair of cutting teeth, that are capable of carving and chopping the wooden panel or the like.

More in detail, with particular reference to FIGS. 2 and 4, the/each removable spacer element 10 preferably comprises: a rigid central disc 11 preferably made of metal material, which is provided with a central pass-through hole 12 with a given diameter, adapted to be engaged in a pass-through manner by the spindle (not shown) of the table saw or similar tool machine; and a plurality of protruding teeth 13 that extend cantilevered from the periphery of the central disc 11 in a substantially radial direction, and are appropriately spaced along the periphery of the central disc 11. The front edge of each protruding tooth 13, in addition, is at least partially covered by an insert 14 made of metal or other hard material, which forms the cutting part of the tooth 13.

Preferably, the outer diameter of the central disc 11 of the or of each removable spacer element 10 is moreover lower than or equal to the outer diameter of the central disc 4 of disc blades 2 and 3.

In addition, analogously to the protruding teeth 6 of disc blades 2 and 3, also the protruding teeth 13 are preferably made in one piece with the central disc 11, and are preferably spaced in a substantially regular manner along the periphery of the central disc 11.

Preferably, each tooth 13 moreover extends cantilevered from the periphery of central disc 11 while remaining substantially coplanar to the central disc 11.

With reference to FIGS. 1, 2 and 4, each cutting insert 14, in turn, is structured/dimensioned so as to extend cantilevered from opposite sides of the front edge of tooth 13, towards the disc blades 2 and 3, and is firmly fixed to the front edge of tooth 13 preferably via welding and/or brazing.

More in detail, each cutting insert 14 of the removable spacer element 10 preferably consists of a small block of widia (tungsten carbide) or other hard metal or composite material, preferably substantially parallelepiped in shape, which is arranged astride of the front edge of protruding tooth 13, and has a maximum width greater than the local thickness of tooth 13, so that the two larger and opposite lateral sides of the block protrude cantilevered from both sides of the same tooth 13.

In the illustrated example, in particular, the cutting inserts 14 of the removable spacer element 10, or rather the blocks of Widia, are preferably dimensioned so as to asymmetrically protrude cantilevered from both sides of the front edge of the tooth 13.

With reference to FIGS. 1, 2 and 4, in addition the/each removable spacer element 10 is preferably also provided with a plurality of deflector fins 15 that extend cantilevered from the periphery of central disc 11 in a substantially radial direction, are appropriately intercalated with the teeth 13, and are preferably shaped so as to facilitate the expulsion of the chips.

More in detail, each deflector fin 15 is preferably located on the periphery of the central disc 11 so as to precede, during rotation of the tool-assembly 1, the closest tooth 13 and its cutting insert 14.

The protruding teeth 13 with the relative cutting inserts 14 and the deflector fins 15 form the cutting toothed crown of the removable spacer element 10.

The central disc 11, in turn, forms the central body of the removable spacer element 10.

Additionally, the cutting toothed crown of each removable spacer element 10 is structured so as to be able to engage in angularly rigid manner with the cutting toothed crown of any one of disc blades 2 and 3 and/or with the cutting toothed crown of another removable spacer element 10, and vice versa.

With reference to FIG. 2, in the illustrated example, in particular, the tool-assembly 1 is preferably provided with three distinct removable spacer elements 10 substantially identical to each other.

Preferably, the nominal thickness $S_1$ of each removable spacer element 10 is furthermore substantially equal to the nominal thickness of the disc blades 2 and 3.

The/each removable spacer element 10 is preferably moreover provided with a pair of protruding teeth 13 that are located on the periphery of central disc 11, in a substantially diametrical/specular position on opposite sides of the central hole 12.

Additionally, the/each removable spacer element 10 is preferably provided with a pair of deflector fins 15 that are located on the periphery of central disc 11, in a substantially diametrical/specular position on opposite sides of the central hole 12, each in proximity of the cutting insert 14 of the immediately adjacent tooth 13.

With reference to FIGS. 1, 2 and 3, in addition each deflector fin 15 of removable spacer element 10 is preferably provided with a small receiving seat 16, which is preferably located roughly in the center of the same deflector fin 15, and is shaped/dimensioned so as to be able to house/accommodate indifferently any one of the cutting inserts 7 of the disc blade 2 or 3, or any one of the cutting inserts 14 of another removable spacer element 10.

Such receiving seat 16 preferably moreover consists of a small radial notch made on the crest of the deflector fin 15, and optionally also has a shape substantially complementary to the profile of the cutting inserts 7 of the disc blade 2 and 3, and/or to the profile of the cutting inserts 14 of each removable spacer element 10.

Clearly, in a different embodiment, instead of being located on the deflector fin 15, the receiving seat 16 may be made directly on the crest of the protruding tooth 13 of the removable spacer element 10, spaced behind the front edge of the tooth where the cutting insert 14 is located.

Figure 5:
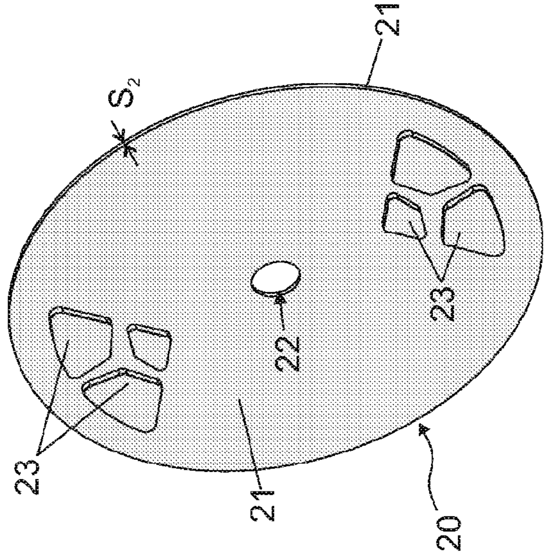

In addition, with reference to FIGS. 1, 2 and 5, the tool-assembly 1 preferably comprises at least one and more conveniently a plurality of second removable spacer elements 20, separate and distinct from the disc blades 2 and 3 and from the removable spacer elements 10, which are substantially discoidal in shape, are provided with a central pass-through hole, and are adapted to be selectively fitted on the spindle (not shown) on their own or in combination with each other, so as to be interposed between the disc blades 2 and 3 and/or the removable spacer element/elements 10, for maintaining the disc blades 2 and 3 and/or the removable spacer element/elements 10 spaced one from the other when the lateral disc blades 2 and 3 are tightened one against the other by the spindle (not shown).

Preferably, the removable spacer elements 20 moreover have a nominal diameter slightly lower than that of the disc blades 2 and 3.

In addition, the removable spacer element/elements 20 preferably have a nominal thickness $S_2$ lower than the nominal thickness of the disc blades 2 and 3 and/or than the nominal thickness $S_1$ of each removable spacer element 10.

More specifically, the removable spacer elements 20 have a nominal thickness $S_2$ preferably ranging between 0.5 and 3 mm (millimeters).

The/each removable spacer element 20 is furthermore structured so as to be able to engage in an angularly rigid manner with the central body of any one of the disc blades 2 and 3 and/or of a removable spacer element 10, far from the cutting toothed crown of the disc blade 2, 3 or of the removable spacer element 10, and vice versa.

More in detail, with particular reference to FIGS. 2 and 5, the/each removable spacer element 20 preferably comprises: a rigid central disc 21 preferably made of plastic material, which is provided with a central pass-through hole 22 of given diameter, adapted to be engaged in pass-through manner by the spindle (not shown) of the table saw or similar tool machine; and a plurality of eccentric protrusions 23 that protrude from both opposite faces of the central disc 21, and are preferably located, on each face of the central disc 21, on opposite sides of the central hole 22, at a predefined distance from the latter.

In addition, the outer diameter of the central disc 21 is preferably lower than the outer diameter of the central disc 11 of the or of each removable spacer element 10 and/or than the outer diameter of the central disc 4 of the disc blades 2 and 3.

Preferably, the arrangements of the eccentric protrusions 23 on the two opposite faces of central disc 21 are moreover substantially specular to each other, so that the various protrusions 23 are, in pairs, aligned with each other.

The protrusions 23 of each removable spacer element 20 are adapted to engage corresponding pass-through openings 24 preferably complementary in shape, which are specifically made on the central body of disc blades 2 and 3, or rather on the central disc 4 of disc blades 2 and 3. In addition, the protrusions 23 of the or of each removable spacer element 20 are preferably also adapted to engage respective pass-through openings 25 preferably complementary in shape, which are made on the central body of each removable spacer element 10, or rather on the central disc 11 of each removable spacer element 10.

Preferably, the arrangements of protrusions 23 on the two opposite faces of central disc 21 are moreover substantially specular to each other, so that the various protrusions 23 are, in pairs, aligned with each other.

In addition, the height of the protrusions 23 of the removable spacer element 20 preferably under-approximates the nominal thickness of the disc blades 2 and 3 and/or the nominal thickness $S_1$ of each removable spacer element 10.

In the illustrated example, in particular, the tool-assembly 1 is preferably provided with three distinct removable spacer elements 20, substantially identical to each other. The/each removable spacer element 20 is preferably furthermore provided, on both faces of the central disc 21, with two distinct groups of protrusions 23 preferably substantially loboidal in shape, which are located on the face of central disc 21, in a substantially specular position on opposite sides of the central hole 22.

Figure 6:
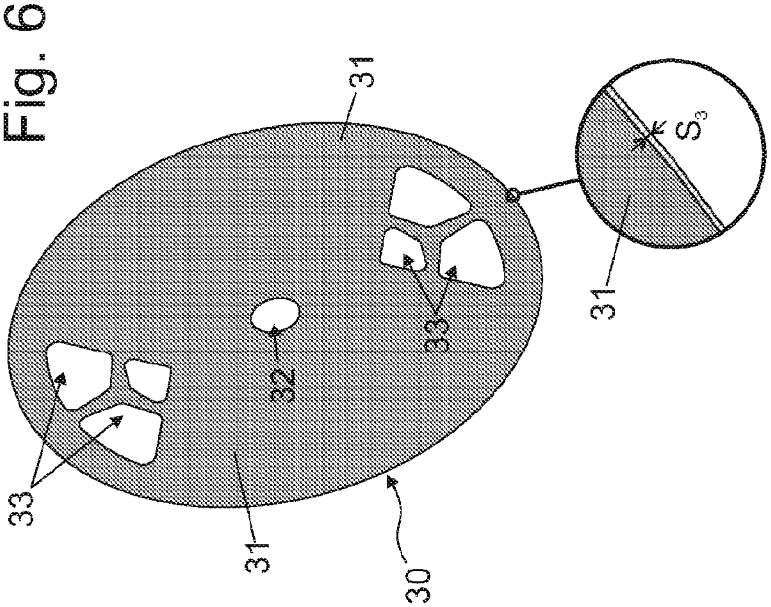
FIGS. 4, 5 and 6 are perspective views of as many components of the tool-assembly illustrated in FIGS. 1 and 2.

With reference to FIGS. 1, 2 and 6, finally the tool-assembly 1 preferably also comprises at least one or more conveniently a plurality of third removable spacer elements 30, separate and distinct from the disc blades 2 and 3 and from the removable spacer elements 10 and 20, which are substantially discoidal in shape, are provided with a central pass-through hole, and are adapted to be selectively fitted on the spindle (not shown) on their own or in combination with each other, so as to be interposed between the disc blades 2 and 3 and/or the removable spacer elements 10 and/or 20, for maintaining the disc blades 2 and 3 and/or the removable spacer element/elements 10 and/or 20 spaced one from the other when the lateral disc blades 2 and 3 are tightened one against the other by the spindle (not shown).

Preferably, the removable spacer elements 30 moreover have a nominal diameter lower than that of the disc blades 2 and 3.

In addition, the removable spacer elements 30 preferably have a nominal thickness $S_3$ lower than the nominal thickness of the disc blades 2 and 3 and/or than the nominal thickness $S_1$ of each removable spacer element 10 and/or than the nominal thickness $S_2$ of each removable spacer element 20.

More specifically, the removable spacer elements 30 preferably have a nominal thickness $S_3$ substantially equal to a submultiple of the nominal thickness of the disc blades 2 and 3, and/or to a submultiple of the nominal thickness $S_1$ of each removable spacer element 10.

In addition, the removable spacer elements 30 have a nominal thickness $S_3$ preferably lower than 0.9 mm (millimeters).

The/each removable spacer element 30 is further structured so as to be able to engage in an angularly rigid manner with one or more of the removable spacer elements 20.

More specifically, with particular reference to FIGS. 2 and 6, the/each removable spacer element 30 preferably consists of a thin sheet-material disc 31 circular in shape, which is provided with a central pass-through hole 32 of given diameter, adapted to be engaged in pass-through manner by the spindle (not shown) of the table saw or similar tool machine; and with a plurality of eccentric pass-through openings 33, that are distributed around the central pass-through hole 32 and are adapted to be engaged by the protrusions 23 of the removable spacer element 20.

Preferably, the sheet-material disc 31 is furthermore made of plastic or metal material.

In addition, the outer diameter of the sheet-material disc 31 is preferably lower than the outer diameter of the central disc 4 of disc blades 2 and 3, and optionally also lower than or equal to the outer diameter of the central disc 11 of the or of each removable spacer element 10 and/or to the outer diameter of the central disc 21 of the or of each removable spacer element 20.

Clearly, the sheet-material disc 31 constitutes the central discoidal body of the removable spacer element 30.

Preferably, the eccentric pass-through openings 33 moreover have a shape substantially complementary to that of the protrusions 23 of the or of each removable spacer element 20.

Preferably, the arrangement of the eccentric pass-through openings 33 on the sheet-material disc 31 furthermore copies that of the protrusions 23 on the central disc 21 of the removable spacer element 20.

In the illustrated example, in particular, the tool-assembly 1 is preferably provided with eight different removable spacer elements 30, substantially identical to each other.

Moreover the/each removable spacer element 30 is preferably provided with two distinct groups of eccentric pass-through openings 33, which are located on the sheet-material disc 31 in a substantially specular position on opposite sides of the central hole 32.

Operation of tool-assembly 1 is easy inferable from what above and does not require further explanations.

The advantages connected with the particular structure of the tool-assembly 1 are remarkable.

First of all, the mechanical coupling between the disc blades 2 and 3 and the removable spacer elements 10, 20 and/or 30 prevents any relative rotation between the single components of the tool.

In this manner, it is eliminated the risk that the protruding teeth 6 of the disc blades 2 can accidentally rub or beat against the protruding teeth 6 of the disc blades 3 and/or against the protruding teeth 13 of the chipper/chippers 10, thus causing the breaking and the detachment of all or part of any cutting insert 7 or 14.

In addition, the mechanical coupling between the disc blades 2 and 3 and the removable spacer elements 10, 20 and/or 30 is realized in proximity of the periphery of the tool, hence the mechanical stresses to which the cutting inserts 7 or 14 are subjected are of reduced entity.

It is finally clear that modifications and variants can be made to the above-described tool-assembly 1 without however departing from the scope of protection of the present invention.

For example, in a more sophisticated embodiment, the disc blades 2 and 3 can comprise, in addition to the protruding teeth 6, also a plurality of deflector fins that extend cantilevered from the periphery of the central disc 4 in a substantially radial direction, are appropriately intercalated with the teeth 6, and are preferably shaped so as to facilitate the expulsion of the chips.

In this embodiment, the receiving seats 8 for the cutting inserts 7 and/or 14 may be optionally located on the deflector fins of the disc blades 2 and 3.

In other words, each receiving seat 8 may optionally consist of a small radial notch made on the crest of a respective deflector fin of the disc blade 2, 3.

Finally, the sheet-material disc 31 may also be made of paper or cardboard.

The invention claimed is:

1. A rotatable tool-assembly for processing wooden panels and the like, the rotatable tool-assembly comprising:

at least a first and a second disc blades that are adapted to be fitted on a same spindle, one beside and coaxial with the other, and one or more removable spacer elements separate and distinct from said first and second disc blades;

wherein said first and said second disc blades are both provided with a central discoidal body and a cutting toothed crown that comprises a plurality of protruding teeth that extend cantilevered from a periphery of the central discoidal body and are appropriately distributed along the periphery of said central discoidal body; a front edge of at least one of said plurality of protruding teeth being covered by a cutting insert;

wherein one or more of the cutting inserts of the first disc blade extend cantilevered sideways of the front edge of the tooth, towards the adjacent second disc blade, and one or more of the cutting inserts of the second disc blade extend cantilevered sideways of the front edge of the tooth, towards the adjacent first disc blade;

wherein at least one protruding tooth of said first disc blade and/or of said second disc blade is provided with a receiving seat which is located spaced behind the front edge of the tooth, and is shaped/dimensioned so as to house/accommodate any one of the cutting inserts of the adjacent disc blade;

wherein said one or more removable spacer elements comprise at least one first removable spacer element, separate and distinct from said first and second disc blades, which is provided with a central discoidal body and with a cutting toothed crown that comprises a plurality of protruding teeth which extend cantilevered from the periphery of the central discoidal body and are appropriately distributed along the periphery of said central discoidal body; the front edge of at least one of said protruding teeth being covered by a cutting insert that extends cantilevered from both sides of the front edge of said protruding tooth, and is adapted to engage any one of the receiving seats present in the cutting toothed crown of said first and/or of said second disc blade;

wherein the cutting toothed crown of said first disc blade is structured so as to be able to mesh in angularly rigid manner with the cutting toothed crown of said second disc blade and/or with cutting toothed crown of said first removable spacer element and vice versa.

2. The rotatable tool-assembly according to claim 1, wherein the cutting toothed crown of the first and of the second disc blade additionally comprises a plurality of deflector fins that extend cantilevered from the periphery of the central discoidal body and are intercalated with the protruding teeth.

3. The rotatable tool-assembly according to claim 1, wherein each protruding tooth of said first and of said second disc blades is provided with a sideways-protruding cutting insert, and wherein each protruding tooth of said first and of said second disc blade is provided with a respective receiving seat.

4. The rotatable tool-assembly according to claim 1, said receiving seat is a radial notch made on a crest of the protruding tooth of said first or of said second disc blade.

5. The rotatable tool-assembly according to claim 2, wherein at least one deflector fin of said first disc blade and/or of said second disc blade is provided with a receiving seat which is shaped/dimensioned so as to house/accommodate any one of the cutting inserts of the adjacent disc blade.

6. The rotatable tool-assembly according to claim 2, wherein each deflector fin of said first and of said second disc blade is provided with a respective receiving seat.

7. The rotatable tool-assembly according to claim 2, wherein said receiving seat is a radial notch made on a crest of the deflector fin of said first or of said second disc blade.

8. The rotatable tool-assembly according to claim 1, wherein the cutting toothed crown of said first removable spacer element is structured so as to be able to engage in angularly rigid manner with the cutting toothed crown of another first removable spacer element and vice versa.

9. The rotatable tool-assembly according to claim 1, wherein the cutting toothed crown of said first removable spacer element additionally comprises a plurality of deflector fins that extend cantilevered from the periphery of the central discoidal body and are intercalated with the protruding teeth.

10. The rotatable tool-assembly according to claim 1, wherein at least one protruding tooth of the cutting toothed crown of said first removable spacer element is provided with a receiving seat that is shaped/dimensioned so as to house/accommodate any one of the cutting inserts of said disc blades and/or any one of the cutting inserts of another first removable spacer element.

11. The rotatable tool-assembly according to claim 10, wherein said receiving seat is a radial notch made on a crest of the cutting tooth of said first removable spacer element.

12. The rotatable tool-assembly according to claim 1, wherein said one or more removable spacer elements additionally comprise at least one second removable spacer element, separate and distinct from said disc blades and/or from said first removable spacer element/elements, which is provided with a central discoidal body and with a plurality of eccentric protrusions that protrude from both faces of the central discoidal body and are adapted to engage corresponding first pass-through openings made on the central discoidal body of said disc blades and/or corresponding second pass-through openings made on the central discoidal body of said first removable spacer elements.

13. The rotatable tool-assembly according to claim 12, wherein the nominal thickness of said second removable spacer element is lower than the nominal thickness of said first and second disc blades and/or than the nominal thickness of said first removable spacer element/elements.

14. The rotatable tool-assembly according to claim 12, wherein said one or more removable spacer elements additionally comprise at least one third removable spacer element, separate and distinct from said first and second disc blades and/or from said first removable spacer element/elements and/or from said second removable spacer element/elements, which is provided with a thin central discoidal bod and a plurality of eccentric pass-through openings that are adapted to be engaged by the protrusions present on said second removable spacer element.

15. The rotatable tool-assembly according to claim 9, wherein at least one deflector fin of the cutting toothed crown of said first removable spacer element is provided with a receiving seat that is shaped/dimensioned so as to house/accommodate any one of the cutting inserts of said disc blades and/or any one of the cutting inserts of another first removable spacer element.

16. The rotatable tool-assembly according to claim 15, wherein said receiving seat is a radial notch made on a crest of the deflector fin of said first removable spacer element.

17. A rotatable tool-assembly for processing wooden panels and the like, the rotatable tool-assembly comprising:

at least a first and a second disc blades that are adapted to be fitted on a same spindle, one beside and coaxial with the other, and one or more removable spacer elements separate and distinct from said first and second disc blades;

wherein said first and said second disc blades are both provided with a central discoidal body and a cutting toothed crown that comprises a plurality of protruding teeth that extend cantilevered from a periphery of the central discoidal body and are appropriately distributed along the periphery of said central discoidal body; a front edge of at least one of said plurality of protruding teeth being covered by a cutting insert;

wherein said one or more removable spacer elements comprise at least one first removable spacer element, separate and distinct from said first and second disc blades, which is provided with a central discoidal body and with a cutting toothed crown that comprises a plurality of protruding teeth which extend cantilevered from the periphery of the central discoidal body and are appropriately distributed along the periphery of said central discoidal body; the front edge of at least one of said protruding teeth being covered by a cutting insert that extends cantilevered from both sides of the front edge of said protruding tooth, and is adapted to engage any one of the receiving seats present in the cutting toothed crown of said first and/or of said second disc blade;

wherein the cutting toothed crown of said first disc blade is structured so as to be able to mesh in angularly rigid manner with the cutting toothed crown of said second disc blade and/or with cutting toothed crown of said first removable spacer element and vice versa.

* * * * *